United States Patent [19]
Englar

[11] Patent Number: 5,863,090
[45] Date of Patent: Jan. 26, 1999

[54] PNEUMATIC AERODYNAMIC FORCE-AUGMENTATION, CONTROL AND DRAG-REDUCTION DEVICES FOR RACING CARS AND HIGH-PERFORMANCE SPORTS CARS

[75] Inventor: Robert J. Englar, Marietta, Ga.

[73] Assignee: Georgia Tech Research Corporation, Atlanta, Ga.

[21] Appl. No.: 810,821

[22] Filed: Mar. 6, 1997

Related U.S. Application Data

[60] Provisional application No. 60/029,267, Oct. 25, 1996.

Related U.S. Application Data

[63] Continuation-in-part of Ser. No. 503,185, Jul. 17, 1995.
[51] Int. Cl.[6] .................................................. B62D 37/02
[52] U.S. Cl. ........................................ 296/180.1; 296/208
[58] Field of Search ............................... 296/180.1, 208; 244/207

[56] References Cited

U.S. PATENT DOCUMENTS

| | | | |
|---|---|---|---|
| 2,037,942 | 4/1936 | Stalker | 296/208 X |
| 3,168,997 | 2/1965 | Saunders | 244/207 |
| 3,262,658 | 7/1966 | Reilly | 244/207 |

(List continued on next page.)

FOREIGN PATENT DOCUMENTS

| | | | |
|---|---|---|---|
| 597674 | 11/1925 | France | 244/207 |
| 2726507 | 12/1978 | Germany | 296/180.1 |
| 2270658 | 3/1994 | United Kingdom | 296/180.1 |

OTHER PUBLICATIONS

AIAA Aircraft Systems and Technology Meeting; Design of the Circulation Control Wing STOL Demonstrator Aircraft; R.J. Englar, et al.; Aug. 20, 1979–Aug. 22, 1979; pp. 1–11.

(List continued on next page.)

*Primary Examiner*—Dennis H. Pedder
*Attorney, Agent, or Firm*—Thomas, Kayden, Horstemeyer & Risley

[57] ABSTRACT

A preferred embodiment of the present invention, a blowing system for high performance vehicles, comprises a source of compressed air and a mechanism for regulating and controlling the flow of air from the source. Referring to FIG. 2, the compressed air is routed from its source through the regulating mechanism and to an aerodynamic surface (17) attached to the automobile in any appropriate manner. Although not required, the present system could be augmented by placing a plenum (21) inside the aerodynamic surface (17) for collecting the compressed air. This aerodynamic surface (17) preferably has a rounded trailing edge (19) or edges. The compressed air will be discharged from the aerodynamic surface (17) through a slot (22) in an outer surface of the aerodynamic surface (17). Preferably, the slot (22) would be on an under-side of a rear portion of the aerodynamic surface (17). However, the presence of a second slot on an upper-side of a rear portion of the aerodynamic surface (17) may also be desirable. The tangentially ejected air will then attach to the aerodynamic surface and sweep around the rounded trailing edge (19). Flow across the aerodynamic surface will be entrained, and a greater lift force will be generated, which may be directed either upward (lift) or as a download. Control of drag and aerodynamic moments will also result. In another aspect of the present invention, as in FIG. 6, the effect of the blown aerodynamic surface (62) could be enhanced through a blowing system for vertical end plates (52) at both ends of the aerodynamic surface (62). Compressed air is discharged through slots (54) in the end plates (52). The air will entrain the flow coming from the trailing edge of the aerodynamic surface (62) and enhance the down force. In a further improvement to the present invention, the compressed air discharge slots (67) may be arranged along the rear lower surface of the vehicle's body, which is curved upward to convert the lower body to an aerodynamic surface for download and control moment generation.

5 Claims, 6 Drawing Sheets

U.S. PATENT DOCUMENTS

| | | | |
|---|---|---|---|
| 3,584,811 | 6/1971 | Leavy et al. | 244/207 |
| 3,669,386 | 6/1972 | Jacobs et al. | 244/207 |
| 3,670,994 | 6/1972 | Kizilos | 244/207 |
| 3,830,450 | 8/1974 | Williams et al. | 244/42 |
| 4,387,869 | 6/1983 | Englar et al. | 244/207 |
| 4,388,687 | 6/1983 | Nichols et al. | 244/207 |
| 4,457,480 | 7/1984 | Englar et al. | 244/207 |
| 4,463,920 | 8/1984 | Nichols et al. | 244/207 |
| 4,682,746 | 7/1987 | Thomas | 244/207 |
| 4,736,913 | 4/1988 | Bennett et al. | 244/130 |
| 4,844,385 | 7/1989 | Bennett et al. | 244/207 |
| 5,374,013 | 12/1994 | Bassett et al. | 296/180.1 Z |

OTHER PUBLICATIONS

AIAA Applied Aerodynamics Conference; Development of Advanced Circulation Control Wing High Lift Airfoils; R.J. Englar, et al.; Aug. 31, 1983–Aug. 15, 1983; pp. 1–11.

AIAA 23rd Aerospace Science Meeting; Circulation Control Airfoils–Past, Present, Future; N. Wood, et al.; Jan. 14, 1985–Jan. 17, 1985; pp. 1–21.

AIAA 25th Aerospace Sciences Meeting; Recent Progress In Circulation Control Aerodynamics; J.N. Nielsen, et al.; Jan. 12, 1987–Jan. 15, 1987; pp. 1–33.

Race Car Engineering and Mechanics; P. Van Valkenburgh; 1992; pp. 1, 55–60.

Aerodynamics of Road Vehicles; Butterworth–Heinemann; pp. 1, 270–285.

Race Car Vehicle Dynamics; W.F. Milliken, et al.; pp. 1, 511–520, 1994.

Aerodynamics of Grand Prix cars; R.G. Dominy; pp. 267–274.

The Influence of Aerodynamics on the Design of Formula One Racing Cars; P.G. Wright; vol. 3, No. 4, 1982; pp. 383–396.

Vehicle Aerodynamics: Wind Tunnels, CFD, Aeroacoustics, and Ground Transportation Systems; SP–1145; Society of Automotive Engineers, Inc.; pp. 1, 27–38, pp. 269–276.

Race Car Aerodynamics: Designing for Speed; J. Katz; pp. 168–237.

AIAA Applied Aerodynamics Conference; An Experimental Investigation of Supercritical and Circulation Control Airfoils at Transonic Speeds Using Holographic Interferometry; W.D. Bachalo; Jul. 13, 1983–Jul. 15, 1983; pp. 1–17.

AIAA 6th Aircraft Design, Flight Test and Operations Meeting; Flight Performance of a Circulation Controlled STOL; J.L. Loth, et al.; Aug. 12, 1974–Aug. 14, 1974; pp. 1–8.

AIAA 80–1825R; Advanced Circulation Control Wing System for Navy STOL Aircraft; J.H. Nichols, et al., reprinted from Journal of Aircraft; vol. 18, No. 12; Dec. 1981.

AIAA Aircraft Systems and Technology Conference; Development of the Circulation Control Wing/Upper Surface Blowing Powered Lift System for STOL Aircraft; M.J. Harris, et al.; Aug. 22, 1982–Aug. 27, 1982; pp. 931–939.

Paper No. 81–0151 presented at AIAA 19th Aerospace Sciences Meeting; J.H. Nichols, et al.; Jan. 12, 1981–Jan. 15, 1981; pp. 1–10.

PNEUMATIC AERODYNAMIC FORCE-AUGMENTATION, CONTROL AND DRAG-REDUCTION DEVICES FOR RACING CARS AND HIGH-PERFORMANCE SPORTS CARS

RELATED APPLICATIONS

This application is based upon, and claims priority to, the following prior-filed applications: provisional application Ser. No. 60/029,267, filed Oct. 25, 1996 now abandoned, and a continuation-in-part of non-provisional application Ser. No. 08/503,185, filed on Jul. 17, 1995.

FIELD OF THE INVENTION

The present invention generally relates to pneumatic aerodynamic control, force augmentation and drag-reduction devices for ground vehicles. More particularly, the present invention relates to apparatuses and methods for blowing low-pressure air across various surfaces of high-performance ground vehicles to modify the aerodynamic forces and moments thereon.

BACKGROUND OF THE INVENTION

High performance sports cars or racing cars present special control and handling problems to designers and drivers. Often, these types of cars travel at such high speeds, and are so aerodynamic in design, that the body of the car generates an upward lift force. The lift force generated may be so strong as to affect the handling of the car. Aerodynamic drag and moments are also generated and can affect handling and safety.

In an effort to remedy such dangerous handling problems, and to improve cornering performance, it is common to see very large horizontal "wings" on high performance sports cars or racing cars. An example of these horizontal surfaces on racing cars is depicted in FIGS. 1a and 1b. These horizontal wings are often three-dimensional airfoils, which have an inverted camber such that as air passes over them, a down force (or "negative lift") is imparted on the vehicle. This down force can overcome the undesired lift force generated by the vehicle's body and improve the vehicle's handling characteristics.

Obviously, it is a goal of high performance racing car designers to achieve a strong down force on the car. As noted above, attempts to remedy handling problems include using horizontal surfaces, such as inverted airfoils/wings, attached to the upper body of the ground vehicle (both fore and aft). Inverted airfoils generally can provide down load (negative lift) and pitching moment to control the vehicle. The need for down load is so critical with specialized racing vehicles, such as Formula One and Indianapolis-type cars, that it is common to see inverted airfoils on both the front and rear sections of these vehicles. In addition, multiple rear horizontal wings are commonly used to generate additional down force on the vehicle.

At one time, it was common to shape the bottom body panels of the vehicle in order to create additional negative down load. This was used to either augment the effect of the inverted wings or to replace the wings. However, current racing rules prohibit this type of design in many racing categories. Therefore, many racing cars are restricted to using size-limited inverted airfoils on the front and rear of the car and no curvature of the lower body in order to generate the necessary down load and pitching moment. Although these inverted airfoils do generate negative lift, which increases with the square of the vehicle's speed, such airfoils have a number of inherent drawbacks.

Initially, inverted airfoils/horizontal wings are mechanically complex and heavy. These wings also require supporting structures, which increase the drag force on the vehicle and increase the weight penalty paid for the horizontal surface itself. For example, inverted airfoils on the aft of the car are often supported by two vertical plates. See FIGS. 1a and 1b. These plates add weight, disrupt the flow of air over the car, and increase the drag upon the vehicle.

In an effort to increase the down force, the wings used often have highly cambered airfoil sections or use flaps to increase the effective camber of the airfoil. Highly-cambered airfoils, especially those with flaps, create much higher profile drag for the vehicle. Thus, the aerodynamic efficiency of these wings decreases. Additionally, if flaps are used to increase the camber, the mechanical complexity and weight of the vehicle increases. Greater mechanical complexity obviously creates a greater chance for mechanical failure.

The prior art solutions to high-performance vehicle handling problems exhibit other inherent problems. Technical regulations on racing cars and cost practicality on high performance sports cars frequently prohibit the use of mechanical adjustments to modify the airfoil during travel/racing. Therefore, these wings are "point designs." That is, they are optimum only at one particular driving condition, even though a given race or journey may require different optimum down forces for high-speed straightways and for lower-speed turns. While wings designed to generate a smaller down force at higher speeds may not remedy the handling problems described above in slower speed turns, wings designed for large down force at slower speed turns may generate far too much down force at high speed. Too much down force compresses the suspension, bottoms the car on the road and seriously degrades the vehicle's handling. Even if it were within the regulations, or realm of cost practicality, to adjust the angle of attack of the horizontal wings, the weight penalty for such a mechanical component could be substantial. As such, the prior art solution for down force requirements is only efficient at one operating condition of the many faced by high performance ground vehicles.

Under normal driving conditions, a car pitches due to road irregularities, braking, and acceleration. All these occurrences cause changes in angle of attack of the fore and aft wings, which can produce unbalanced lift distributions and cause the car to experience dynamic pitch instabilities. Fixed horizontal wings cannot respond to these problems adequately.

Additionally, the wings employed are not the best lift-producing devices available. The wings used are usually low span and thus lower aspect ratio. Low aspect ratio necessarily causes higher induced drag and strong vortex flow fields. The typical design for these wings on ground vehicles usually does not exceed a lift coefficient of around 4.0. Of course, the particular lift force generated during travel can vary substantially and is proportional to the vehicle speed squared.

Thus, there exists a need for a light-weight, simple, non-moving, dynamically adjustable system for producing variable down forces of much higher magnitudes, with or without drag generation, on a high performance ground vehicle, or racing car. Such system would overcome the many problems of the prior art. It is to the provision of such methods and apparatuses that the present invention is primarily directed.

SUMMARY OF THE INVENTION

In accordance with the present invention, in a preferred embodiment thereof, an airflow control device for a high performance ground vehicle comprises a source of air, or other gas, under pressure and a mechanism for regulating and controlling the flow of air/gas from the source. Although any gas may be used with the present invention, air is the preferred gas and, as such, will be referred to throughout this disclosure. Such a source of air could be compressed air from onboard turbochargers, superchargers or compressors powered by the engine. On the other hand, the source of air could be actual engine exhaust gases routed from the exhaust manifold. If available, heater or air conditioning sources may prove suitable to supply the blowing requirements of the present invention. The regulating mechanism could comprise a valve. The valve should preferably be manually controlled by a driver or, alternatively, a computer receiving data from various sensors (such as accelerometers or pressure transducers) could control the valve.

The compressed air will be routed from its source, through the regulating mechanism, to a substantially horizontally disposed aerodynamic surface attached to the automobile in any appropriate manner. This aerodynamic surface does not necessarily have to be horizontal. Some angle less than 90° to the body of the vehicle is, however, preferred. This aerodynamic surface preferably has a rounded trailing edge, although the present invention is not so limited. The compressed air will be discharged from the aerodynamic surface through a tangential opening, or slot, in an outer surface of the aerodynamic surface. In the preferred embodiment, the air will be ejected transverse to the direction of vehicle motion. Preferably, the slot would be on an under-side of a rear portion of the aerodynamic surface. The tangentially ejected air will then attach to the curved aerodynamic surface and sweep around the rounded trailing edge. Flow across the lower aerodynamic surface will be entrained, and a greater negative lift force (download) will be generated. Although tangentially ejecting slots are preferred, other angles of air ejection are also included here.

The system disclosed herein could work whether the aerodynamic surface is placed at the rear or the front of the vehicle or on the underside of the body itself. This system would also work if an aerodynamic surface is placed both at the rear and at the front of the vehicle. Additionally, the present system could be augmented by placing a plenum inside the aerodynamic surface for collecting the compressed air and permitting an even (or uneven, if so desired) discharge of air out of the opening in the aerodynamic surface.

The aerodynamic surface could be composed of pneumatic (blown) airfoils of many different shapes. For example, standard airfoil shapes modified with rounded aft surfaces and blowing slot/slots could be employed or the airfoil could be shaped as merely a circular cylinder with a tangential blowing slot.

In another aspect, the air could be caused to discharge from both the upper and lower surfaces of the aerodynamic surface. Or, if desired, more than one aerodynamic surface could be used at either the fore or aft portions of the ground vehicle.

In another aspect of the present invention, the effect of the blown aerodynamic surface could be enhanced through a blowing system for vertical plates at both ends of the horizontal aerodynamic surface. The preferred embodiment of the system for blowing end plates comprises a source of air under pressure and a regulating mechanism to control the flow of the air from the source. The source of air could be the same source used to supply air to the aerodynamic surface or a different source. In addition, the two end plates bounding the aerodynamic surface should have slots in their outer skins along an interior surface. Through the slots, the pressurized air will pass and flow around the curved trailing edges of the two end plates. This will entrain the flow coming from the trailing edge of the aerodynamic surface and enhance the down force generated by the horizontal aerodynamic surface by increasing the surface's effective aspect ratio. Furthermore, this embodiment will allow one to generate a side force or a moment upon the vehicle by operating the blowing systems in each supporting plate in a nonuniform matter.

In another aspect of the present invention, the effect of an inverted airfoil aerodynamic surface can be enhanced by a blowing system incorporated on the actual under body of the vehicle. In this embodiment, there is preferably a source of air under pressure as well as a means for regulating the flow of the air from its source. There should be an appropriately sized and spaced slot along the bottom surface of the ground vehicle, and a rounded surface aft of this slot. Through this slot, pressurized air will flow, attach to the vehicle, and follow the curved rear edge of the vehicle itself. The air flow from the body of the vehicle will interact with the horizontal aerodynamic surface causing an even greater down force to be imparted upon the ground vehicle. If desired, the slot could extend around the sides of the ground vehicle in order to add stability and control to the vehicle.

Therefore, an object of the present invention is to provide a device for effectively augmenting down force on a high-performance or racing ground vehicle.

Another object of the present invention is to provide a means for dynamically controlling the down force without using moving exterior parts.

Another object of the present invention is to provide a simple aerodynamic force or control system using very low air flow blowing rates obtained from turbochargers, supercharges, existing air conditioner compressors, engine exhaust, heater blowers, or even free stream flow, with control valves activated by the driver or automatically by sensing the forces or moments acting on the vehicle. An additional object of the present invention is to permit the designer to use exhaust gases from the engine manifold as a blowing source.

Another object of the present invention is to reduce drag for high speed or increase drag for cornering or braking as desired and provide directional control and stability through the use of specially blown end plates supporting the horizontal aerodynamic surfaces.

Another object of the present invention is to eliminate longitudinal aerodynamic instabilities of vehicles operating with an unbalanced lift distribution between front and rear substantially horizontal aerodynamic surfaces.

Other objects, features, and advantages of the present invention will be apparent to one skilled in the art. A more thorough understanding of the invention and its features will be gained through a review of the detailed description set forth below, when taken in conjunction with accompanying drawings, which are briefly described as follows.

DETAILED DESCRIPTION OF THE PREFERRED EMBODIMENT

Figure 1A:
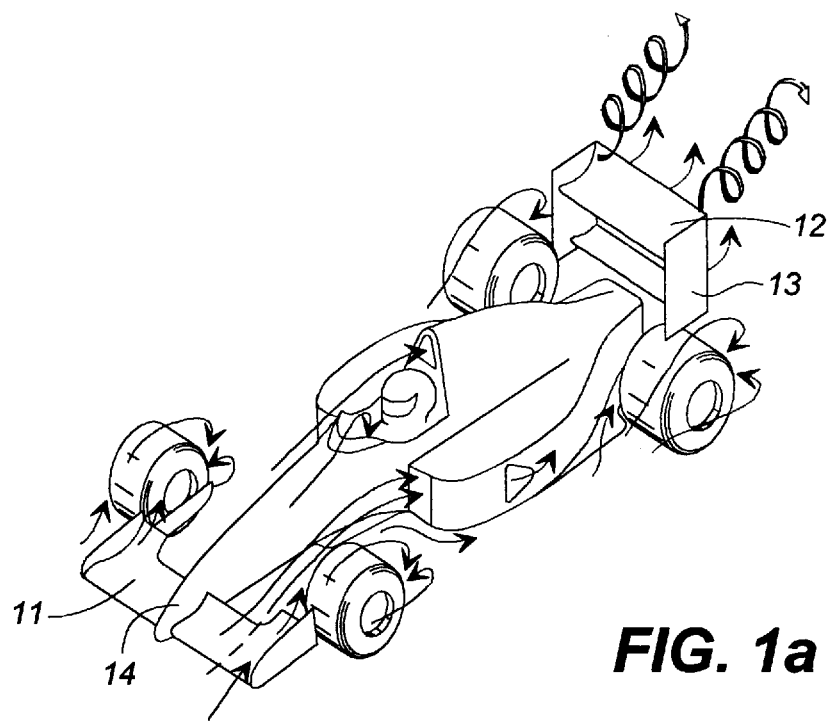
FIG. 1*a* is a top perspective view of a typical high performance racing ground vehicle and the surrounding flow fields.
Figure 1B:
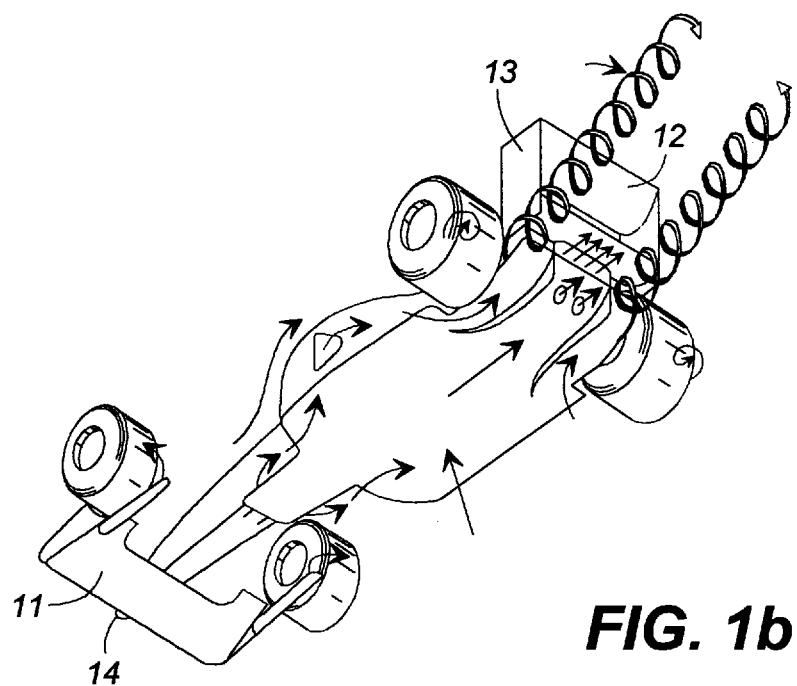
FIG. 1*b* is a bottom perspective view of a typical high performance racing ground vehicle and surrounding flow fields.

Referring now to the drawings, wherein like reference numerals designate corresponding parts throughout the several views, a first preferred embodiment for an air flow control device will now be described. FIGS. 1a and 1b depict a typical Formula-One or Indy-type racing car. A high performance racing vehicle normally has a front horizontal aerodynamic surface 11 as well as a rear horizontal aerodynamic surface 12. The front horizontal aerodynamic surface 11 is usually positioned close to the ground, as depicted in FIG. 1a. The rear horizontal aerodynamic surface 12, on the other hand, is normally positioned much higher off of the ground, as depicted in FIG. 1a. The arrows in FIGS. 1a and 1b depict the air flow about a typical high performance racing car during forward movement.

Figure 2:
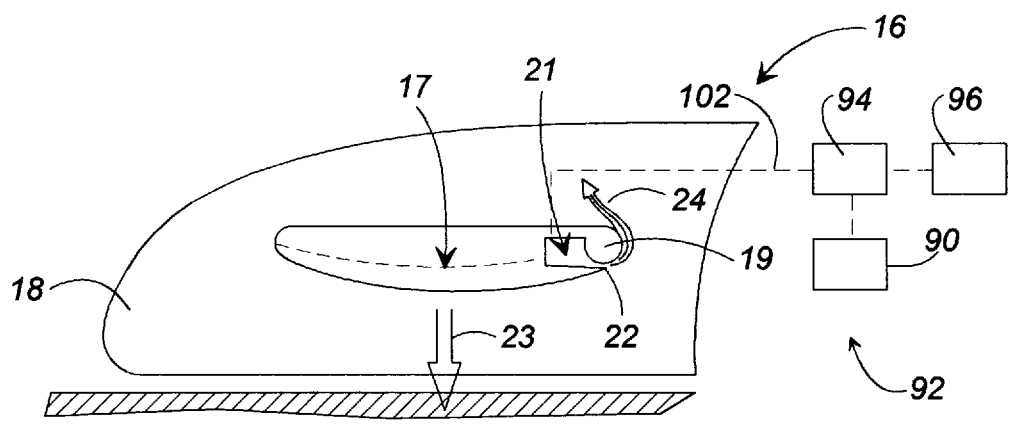
FIG. 2 is a cut-away side view of an inverted pneumatic aerodynamic wing assembly constructed to the specifications of the present invention.

A first preferred embodiment of the present invention is depicted in FIG. 2. FIG. 2 depicts the side view of an inverted pneumatic wing assembly 16, more typical of a front wing assembly. This assembly 16 comprises a substantially horizontal aerodynamic surface 17 with an inverted airfoil section. Typically, the aerodynamic surface is horizontally disposed; however, the present invention is not so limited. The aerodynamic surface 17 is bounded by an end plate 18 at each end. These end plates 18 can serve two purposes, typically. Often, the end plates 18 support the assembly 16 and attach it to the ground vehicle (as shown by reference numeral 13 in FIG. 1a and 1b), and the end plates 18 also improve the negative lift distribution of the aerodynamic surface 17. Therefore, even if the end plates 18 do not support the aerodynamic surface 17, the benefits of better lift distribution and lift augmentation is such that end plates 18 are still normally used. Such a configuration is common among high performance racing ground vehicles.

In the present invention, the aerodynamic surface 17 preferably comprises a rounded trailing edge 19. Furthermore, inside the aerodynamic surface 17 is preferably located a plenum 21. This plenum 21 holds an air (or other gas) supply to be ejected through a slot 22 in the lower rear surface of the aerodynamic surface 17. Although use of a plenum 21 is not necessary to the present invention, the plenum 21 evenly distributes air flow along the length of the slot 22. Preferably, although not limited to such configuration, this slot 22 ejects air tangentially to the local surface, transverse to the direction of vehicle motion, and this slot 22 should span the entire width of the aerodynamic surface 17. However, any shaped opening, or series of openings, would work with the present invention.

The configuration depicted in FIG. 2 could just as easily depict a rear horizontal aerodynamic surface 12, as depicted in FIGS. 1a and 1b. The same components and operation described herein would also apply in such a situation. The only distinction would be that a front aerodynamic surface 11 is usually attached at a center point to the nose 14 of the ground vehicle, and nearer to the ground, as depicted in FIGS. 1 and 2.

The first preferred embodiment further comprises a source of compressed air which is connected to the plenum 21 by some form of piping 102. As noted above, any gas could be used with the present invention. However, air is the gas preferred and, therefore, this disclosure refers to air specifically when many other gases would work with this invention. The source of compressed air could be compressed air from onboard turbochargers, superchargers, compressors powered by the engine, or even actual engine exhaust gasses routed from the exhaust manifold. This air source should preferably have its flow regulated by a flow regulation device, such as a valve 94. A computerized control system 96 actuated by sensors (such as accelerometers or pressure transducers) could operate the flow regulation device, thereby controlling flow out of the slot 22. On the other hand, a driver could manually actuate the valve to control the flow rate of air out of the slot 22.

As pressurized air is emptied into the plenum 21, the air then flows, under higher pressure, through slot 22. Due to low external static pressure, it then curves around the rounded trailing edge 19 of the aerodynamic surface 17. The action of this flow 24 rounding the trailing edge 19 of the aerodynamic surface 17 entrains the free stream fluid flowing over the aerodynamic surface 17 such that the circulation about the aerodynamic surface 17 is greatly increased. A circulation increase corresponds to an increase in the force which the aerodynamic surface 17 imparts upon the high performance ground vehicle. Because the aerodynamic surface 17 typically has an inverted airfoil section, the force imparted is downward, as depicted by arrow 23 in FIG. 2.

Notice particularly that the functioning of the present invention does not depend on the existence of the end plates 18. A designer of the ground vehicle may not wish to pay the associated drag penalty. In this case, any suitable support means could be used for the wing assembly 16. For example, a rear aerodynamic surface 17 could be attached to the ground vehicle by a strut at a center point of the aerodynamic surface 17.

Furthermore, a rounded trailing edge 19 with a substantially uniform radius, as depicted in FIG. 2, is not the only trailing edge configuration that will work with the present invention. So long as the trailing edge of the aerodynamic surface 17 is at least mildly rounded, the flow coming from the slot 22 will attach to the wing surface due to reduced static pressure. Even if the trailing edge of this rounded surface is sharp, decreased drag could result from blowing air out of the slot 22.

Figure 3:
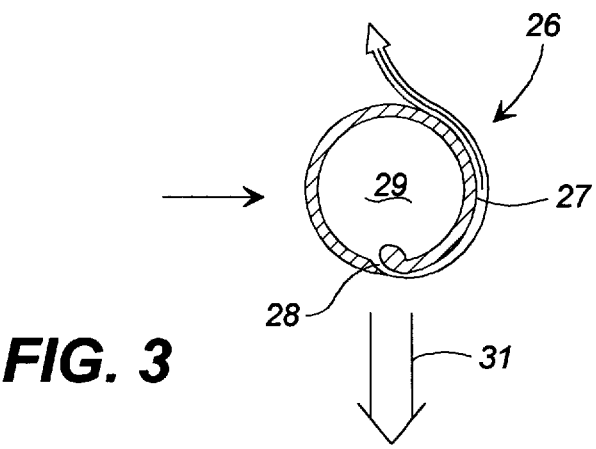
FIG. 3 is a cut-away side view of a circular cylinder pneumatic airfoil.

In addition, the aerodynamic surface 17 could have an airfoil section of any camber. In fact, a symmetric airfoil, with no camber at all, could be used with great effectiveness. FIG. 3 depicts a cross section of an airfoil section 26 which is simply a circular cylinder. This airfoil section 26 also comprises a rounded trailing edge 27 and a slot 28 on the lower surface of the airfoil section 26. A plenum 29 is housed in the interior of the circular cylinder airfoil section 26. A circular cylinder section 26 functions in the same manner as the negatively cambered airfoil section of the aerodynamic surface 17 described above and in FIG. 2. However, this circular cylinder airfoil section 26 produces a much higher coefficient of lift when air is blown from the slot 28 and, therefore, a corresponding increase in the down force on the vehicle results, as depicted by the arrow 31 in FIG. 3. Although not depicted with end plates, the circular cylinder airfoil of FIG. 3 can be used with end plates like those depicted in FIG. 2.

Figure 4A:
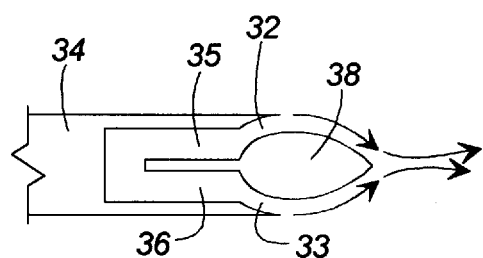
FIG. 4a is a cut-away side view of a double slotted airfoil section with an arced trailing edge for use in a pneumatic aerodynamic wing assembly.

It is not necessary to the present invention that only one slot on an under-surface of the aerodynamic surface be employed. As depicted in FIG. 4a, a first slot 32 and a second slot 33 may be formed in the upper and lower surfaces of the aerodynamic surface 34 respectively. The first slot 32 permits a flow of air therethrough by means of a first plenum 35 distributing the air from a source of pressurized air 90. The second slot 33 also permits a flow of air, but this flow is distributed by a second plenum 36. The air emitted from the second slot 33 may be supplied by the same source of pressurized air as the first slot 32 or from a different source, if preferred. However, the flow of air into each plenum 35, 36 should preferably be separately controlled and regulated by its own regulating mechanism 106. As discussed above, a valve actuated by sensors or the driver would appropriately regulate the flow. This configuration of aerodynamic surface would likely use an uncambered airfoil.

Figure 4B:
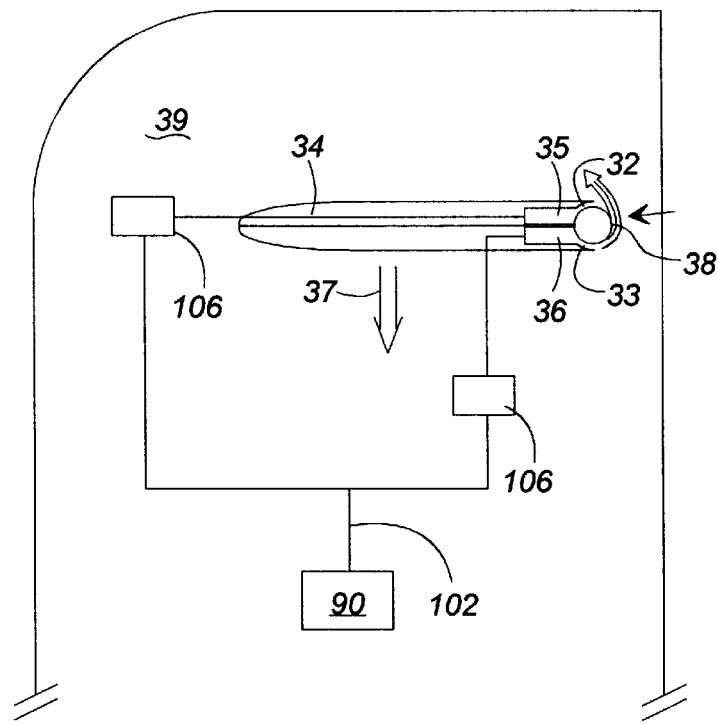
FIG. 4b is a cut-away side view of a pneumatic wing assembly constructed to the specifications of the present invention with a double slotted pneumatic airfoil having a rounded trailing edge.

FIG. 4b depicts the dual slotted aerodynamic surface 34 described above supported by end plates 39. These end plates 39 are more typical of an assembly for the rear of a ground vehicle where the end plates 39 support the aerodynamic surface 34.

The first slot 32 and the second slot 33 of the surface 34 may be blown simultaneously to reduce drag by eliminating flow separation and producing jet-like thrust. On the other hand, only one of the two slots 32, 33 can be blown to generate a very high lift force (acting in the direction of the side of the aerodynamic surface 34 in which the slot 32, 33 blown is located) accompanied by high induced drag to slow down the vehicle for corners. For example, if the first, upper slot 32 is the only slot out of which air is blown, a positive upward lift force and increased drag will be imparted to the vehicle. On the other hand, if the second, lower slot 33 is the only slot out of which air is blown, a very strong down force, as depicted by arrow 37, will be imparted on the ground vehicle as will increased drag. This generation of a positive or negative lift force from the same airfoil section 34, without changing the angle of attack, could prove quite beneficial in damping undesired forces or in providing stability and dynamic ride control.

While FIG. 4b depicts the typical embodiment of a dual slotted aerodynamic surface 34 with a rounded trailing edge 38, an alternate embodiment is shown on FIG. 4a. In FIG. 4a, the trailing edge 38 is not circular in cross section, but comprises two circular arc segments meeting in a sharp trailing edge 38. With regard to the sharp trailing edge, when one or both slots 32, 33 are blown, high lift or download will be generated, but the lesser turning of the jet/jets will produce thrust recovery and reduce drag for better high speed performance. In both configurations, the aerodynamic surface will usually be located between or supported by end plates 39 as shown in FIG. 4b.

In all of the preferred embodiments of the present invention, blowing at pressures of slightly less than 14 psig can produce rapid, and substantial, force changes occurring at the speed of sound. Additionally, the double slotted aerodynamic surface 34 could be either cambered or completely uncambered, as depicted in FIG. 4a and 4b. The trailing edge 38 of the double slotted airfoil section 34 may be circular in shape, for maximum turning of the jet of air emitted from the slots 32, 33, or the trailing edge 38 could be arced to a sharper point for less turning of the air (less force) but greater drag reduction.

Figure 5A:
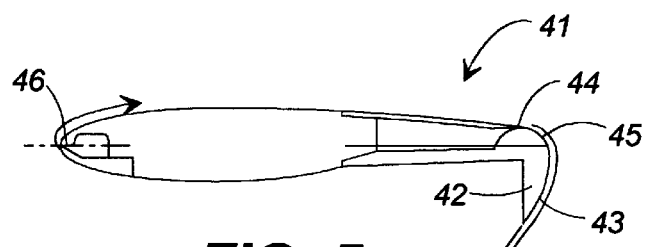
FIG. 5a is a cut-away side view of a blown airfoil with a dual radius flap and leading edge blowing for use in a pneumatic wing assembly.

A further refinement of the present invention would be to use a dual-radius blown airfoil 41 with the aerodynamic surface as depicted in FIG. 5a. This airfoil 41 has a flap 42 with very small chord. This airfoil 41 has a small radius 45 for flap rotation and enhanced blown jet turning. The airfoil 41 also has a larger secondary flap radius 43 to assure jet turning to higher angles further downstream from the slot 44, where jet momentum has diminished. The deflection angle of the flap 42 may be varied prior to a race to change lift, drag and moment forces produced by the airfoil 41. At zero flap deflection, high lift may still be obtained since the upper surface 43 of the flap 42 is highly curved. The low flap deflection greatly reduces profile drag. This flap angle will be set prior to a race or travel, depending on the conditions anticipated, but fine tuning of the lift and drag during travel is possible by variation in slot blowing without mechanical modifications to the aerodynamic surface itself. Preferably, the airfoil as shown would be inverted for installation on a high performance ground vehicle.

Larger blowing on a more highly deflected flap will actually produce an increase in drag along with the higher negative lift generated. This can be used to beneficially slow the vehicle at the same time the increased down force is loading the tires, thereby increasing braking capability. This airfoil section 41 also incorporates leading edge blowing by way of a non-moving slot 46 near the leading edge of the airfoil 41. This blowing system can be constructed exactly like the system for blowing pressurized air described in FIG. 2, above. This blown slot 46 will prevent leading edge flow separation, which will occur at high local angles of the attack, or flow separation at very large lift/circulation values. Leading edge blowing could also be applied to any of the other blown airfoils discussed above. This type of airfoil 41 can generate a coefficient of lift as high as 8.0 at zero angle of attack, as confirmed by experiment by this invention.

Figure 5B:
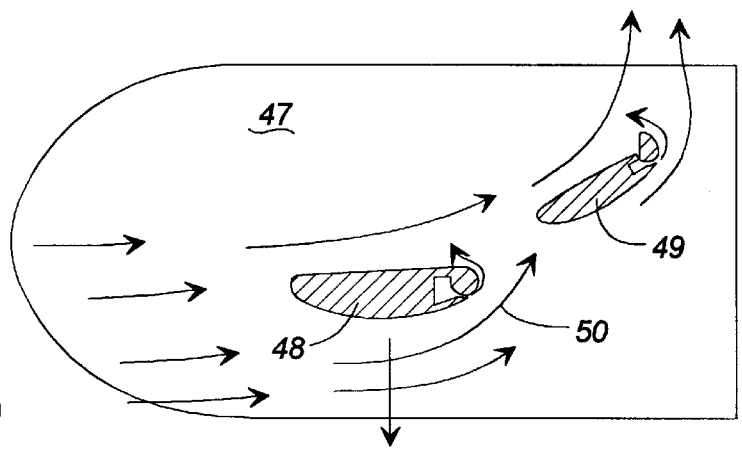
FIG. 5b is a cut-away side view of a pneumatic wing assembly employing two blown airfoil aerodynamic surfaces.

If even greater downforces are required, two or more aerodynamic surfaces with blown airfoils could be staggered vertically at the aft portion of the vehicle so that the deflected flow field from the lower airfoil 48 could be further entrained by an upper airfoil 49. This configuration is depicted in FIG. 5b. The second airfoil 49 would be aligned to benefit from the downward flow field 50 of the first blown airfoil 48 to produce even greater downloads on the ground vehicle. Also, the two airfoils 48, 49 could be blown at different blowing rates to control drag generation (greater or less) and pitching moment to give greater dynamic stability.

Figure 6:
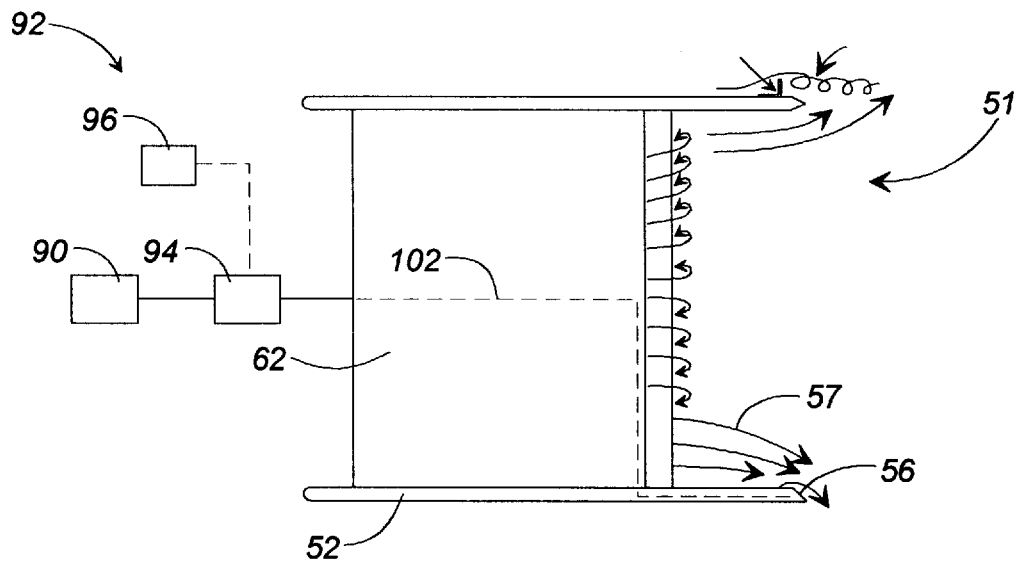
FIG. 6 is a top view of a pneumatic wing assembly according to the present invention with blown vertical side plates.
Figure 7:
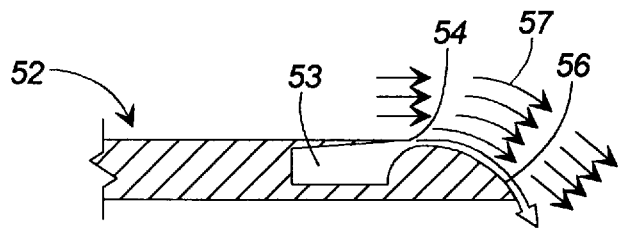
FIG. 7 is a cut-away top view of a vertical end plate with an arced blown trailing edge.

In another aspect of the present invention, FIG. 6 depicts an improvement to a aerodynamic surface assembly 51 which increases the effectiveness of the supporting end plates, which, in turn, increases the effectiveness of the entire aerodynamic surface assembly 51. As previously discussed, end plates 52 are usually installed on these assemblies 51 to increase the effective aspect ratio of the aerodynamic surface. FIG. 7 depicts the aft portion of an end plate 52 according to the present invention from a top view. Inside this specifically adapted end plate 52 is located a plenum 53 which discharges pressurized air through a slot 54 in the surface of the end plate 52. The air can be supplied from any source of compressed air, such as an engine-powered compressor. The air flow into the plenum 53 should preferably be regulated with a valve 94 or other suitable regulating mechanism. The air discharged from the slot 54 follows the curved trailing edge 56 of the end plate 52 and entrains the flow across the surface of the end plate 52. This entrainment of flow between the two end plates is depicted in FIGS. 6 and 7 by arrows 57. These end plates 52 on a pneumatic aerodynamic surface are designed to function similarly to the blown aerodynamic surface 17 described with respect to FIG. 2.

Figure 8:
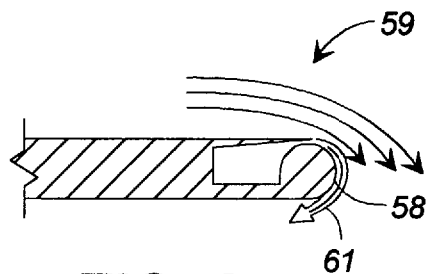
FIG. 8 is a cut-away top view of a vertical end plate with a rounded blown trailing edge.

The curved trailing edge 56 depicted in FIG. 7 is not the only configuration which will work with the present preferred embodiment. FIG. 8 depicts a circular trailing edge 58 on an end plate 59. The circular trailing edge 58 creates greater entrainment of the flow (as depicted by arrows 61), thereby imparting a greater side force on the ground vehicle. However, the embodiment depicted in FIG. 8 will create greater drag on the ground vehicle, which may be used to slow the vehicle in braking or in cornering.

FIG. 6 depicts the end plate of FIG. 7 placed on an aerodynamic surface assembly 51. This aerodynamic surface assembly 51 is comprised of a substantially horizontal aerodynamic surface 62 and blown end plates 52. The entrainment of the flow caused by the blowing system in the end plates 52 increases the effectiveness of the aerodynamic surface 62. Basically, the blown trailing edge 56 of the end plate 52 entrains the local flow because of the much lower static pressure in the blowing jet, creating even higher lift, or down-force, from the aerodynamic surface assembly 51.

The blown end plates depicted in FIGS. 7 and 8 generate side forces, and moments, on the ground vehicle to which they are attached. This could be used to aid the vehicle in turning or to impart stability to the vehicle, since they are now converted to vertical directional control surfaces with no moving parts.

Figure 9:
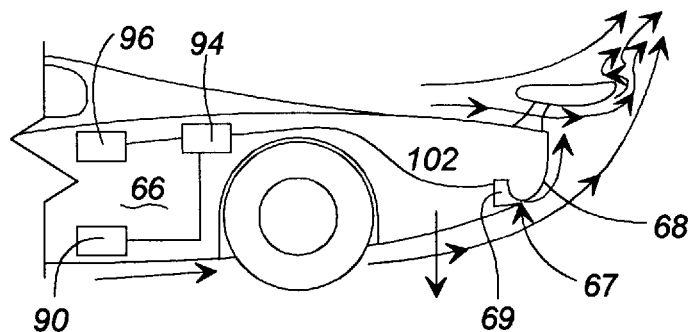
FIG. 9 is a side view of a high performance ground vehicle with both a blown inverted wing according to the present invention and a blown under-body according to the present invention.

In a further improvement to the present invention, FIG. 9 depicts the under surface of a ground vehicle 66 which contains a slot 67 along the under surface of the ground vehicle 66 and near its trailing edge 68. This slot 67 near the rear surface of the ground vehicle 66 ejects air tangent to the under surface of the vehicle 66 that will entrain the flow along the under surface of the vehicle 66. Preferably, the trailing edge 68 of the ground vehicle 66 under surface is rounded or curved upward.

The blowing system depicted in FIG. 9 comprises the same elements as the blowing system for the pneumatic wing assembly 16 depicted in FIG. 2. As such, the slot 67 along the underside of the vehicle 66 can be fluidicly connected to a plenum 69, though not required. Pressurized air is supplied to this plenum 69 from a source of compressed air. Similar to the embodiment described in FIG. 2, this source of pressurized air 90 could be compressed air from onboard turbochargers, superchargers, compressors powered by the engine, or even engine exhaust gases routed from the exhaust manifold. The flow of pressurized air is preferably regulated by an appropriate regulation device, such as a valve 94, to control the flow of pressurized air into the plenum 69. A computerized control system actuated by various sensors or a manual control system actuated by the driver can actuate the regulation device or valve.

Figure 10:
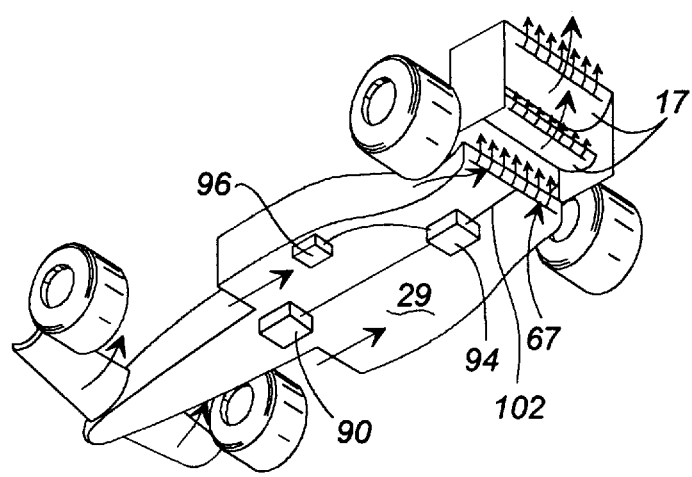
FIG. 10 is a lower rear view showing the interaction of a blown rear wing assembly as influenced by the favorable flow field from a blown lower body assembly.
Figure 11:
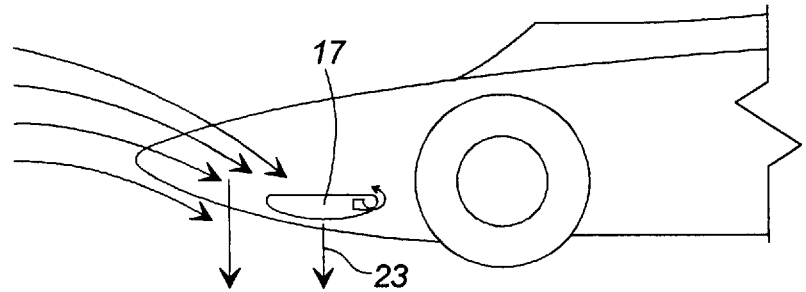
FIG. 11 is a bottom view of an alternate embodiment of the blown lower body assembly of FIG. 10.

Although FIG. 9 shows a typical high performance consumer automobile 66, this embodiment is directly applicable to augment the download produced by the body of a Formula-One or an Indy-type racing vehicle. FIGS. 10 and 11 depict a blowing system as it can be used with high performance racing vehicles 76. The slot 67 depicted in FIGS. 10 and 11 can wrap around and extend all the way to the side of the ground racing vehicle 76. This essentially converts the entire body of the ground racing vehicle 76 into a type of flat inverted airfoil, but the blowing on the curved edges 68 entrains the flow field beneath the car, creating inverted circulation, negative lift, and down force on the vehicle. This, of course, is enabled by the surface's round trailing edge 68 and blowing slot 67, since a conventional flat airfoil will produce virtually no lift at zero angle of attack. The embodiments depicted in FIGS. 9-11 can be used to control aft dynamic pitching by rapid adjustment of the blowing along the rounded trailing edge 68.

Figure 12:
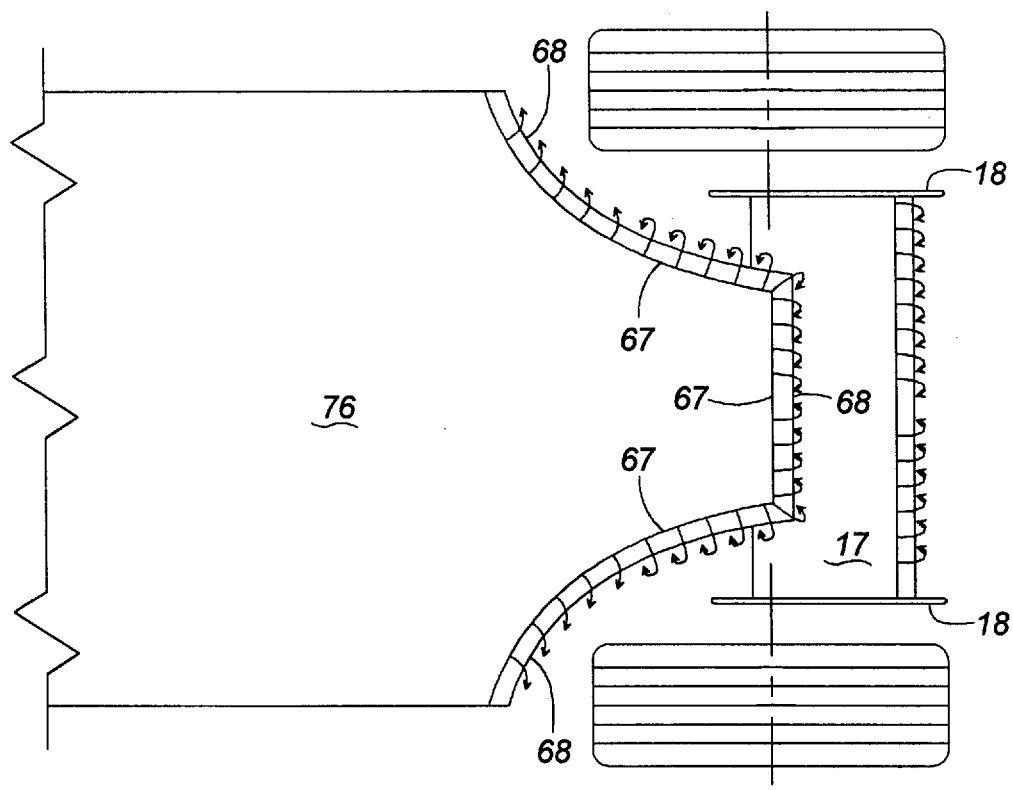
FIG. 12 is a side view of a blown front wing on a racing vehicle.

Of course, the various embodiments described above can be used simultaneously on the same ground vehicles. For example, FIG. 10 depicts the body blowing system in conjunction with a blown aerodynamic surface 17. The aerodynamic surface 17 could be located in the vicinity of a blown under-body for further entrainment of the body's flow field, attachment of the aft flow, and generation of even greater down force, as depicted in FIGS. 10 and 11. Likewise, an efficiently blown front airfoil/wing will generate circulation that produces negative lift, downwash, and nose-down pitching moment, and can yield further down load due to induced suction on the lower section of the car's nose, FIG. 12.

It would be apparent to one skilled in the art that many variations and modifications may be made to the preferred embodiments as described above without substantially departing from the principles of the present invention. All such variations and modifications are intended to be included herein and are within the scope of the present invention, as set forth in the following claims.

What is claimed:

1. An airflow control device for a high-performance ground vehicle, comprising:

a high-performance ground vehicle having a body for housing an operator of said high-performance ground vehicle, said vehicle body having a substantially flat under surface generally parallel to a local ground surface upon which said high-performance ground vehicle travels;

a source of air under pressure, said source of air internal to the body of said high-performance ground vehicle;

a regulating mechanism for controlling a flow of said air from said source;

a first opening formed in said under surface of said high-performance ground vehicle body, wherein said first opening is in fluid connection with said regulating mechanism and permits said air under pressure to be discharged through said first opening in said vehicle body, wherein said air is discharged tangential to said under surface of said high-performance ground vehicle body and opposite to the direction of movement of said high-performance ground vehicle;

a continuous upper body surface vertically above said first opening;

a curved surface on along a under surface of said high-performance ground vehicle body and downstream of said first opening such that said air discharged through said first opening is entrained to flow along said curved surface;

an aerodynamic surface having an upper surface and a lower surface and a leading edge and a trailing edge, said aerodynamic surface attached to the body of said high-performance ground vehicle;

a second opening formed in said lower surface of said aerodynamic surface, wherein said second opening is in fluid connection with said regulating mechanism and permits said air under pressure to be discharged through said second opening tangential to the lower surface of said aerodynamic surface; and a curved surface at said trailing edge of said aerodynamic surface and downstream of said second opening such that said air under pressure when discharged from said second opening is entrained to follow said curved surface.

2. The control device of claim 1, wherein said aerodynamic surface is attached to a front portion of said ground vehicle.

3. The control device of claim 1, wherein said aerodynamic surface is attached to a rear portion of said ground vehicle.

4. The control device of claim 2, wherein said aerodynamic surface is bounded on each end by a vertical side plate.

5. The control device of claim 3, wherein said aerodynamic surface is attached to said ground vehicle by a pair of vertical side plates having a first vertical side plate and a second vertical side plate, wherein said aerodynamic surface is attached at a first end of said aerodynamic surface to said first vertical side plate and at a second end of said aerodynamic surface to said second vertical side plate.

* * * * *